US006689238B2

(12) United States Patent
Barnet

(10) Patent No.: US 6,689,238 B2
(45) Date of Patent: Feb. 10, 2004

(54) LABELLING SYSTEM

(75) Inventor: John Richard Barnet, Tadcaster (GB)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/821,869

(22) Filed: Mar. 30, 2001

(65) Prior Publication Data

US 2001/0025689 A1 Oct. 4, 2001

(30) Foreign Application Priority Data

Mar. 30, 2000 (GB) ............................................ 0007645

(51) Int. Cl.[7] ............................ G09F 3/02; G09F 3/10; B32B 33/00; B32B 35/00; B65C 1/02; B65C 9/00

(52) U.S. Cl. ......................... 156/60; 156/249; 156/556; 156/580; 156/DIG. 2; 156/DIG. 37; 156/428; 156/41.8; 156/43; 156/40; 156/638; 156/674; 156/675

(58) Field of Search .......................... 40/360, 638, 663, 40/673, 674, 368, 675; 156/391, DIG. 37, 60, 247, 249, 556, 580, DIG. 2; 428/41.8, 43

(56) References Cited

U.S. PATENT DOCUMENTS

| | | | | | |
|---|---|---|---|---|---|
| 3,316,709 | A | | 5/1967 | Edwards | |
| 4,507,883 | A | | 4/1985 | Tarrant | |
| 4,758,303 | A | * | 7/1988 | Shastko | 156/542 |
| 4,879,710 | A | | 11/1989 | Iijima | |
| D311,030 | S | | 10/1990 | Lanigan | |
| 5,389,414 | A | * | 2/1995 | Popat | 283/101 |
| 5,787,069 | A | | 7/1998 | Lowe et al. | |
| 5,799,982 | A | | 9/1998 | McClure et al. | |
| 5,925,200 | A | | 7/1999 | Grossman | |
| 5,951,819 | A | * | 9/1999 | Hummell et al. | 156/538 |
| D415,798 | S | | 10/1999 | Davies | |
| 6,054,009 | A | | 4/2000 | Cote et al. | |
| D427,243 | S | | 6/2000 | Luby et al. | |
| 6,168,841 | B1 | | 1/2001 | Chen | |
| 6,273,167 | B1 | * | 8/2001 | Miller | 156/391 |
| 6,279,960 | B1 | * | 8/2001 | Claussnitzer | 283/101 |
| 6,302,176 | B1 | | 10/2001 | Chen | |
| 6,315,021 | B1 | * | 11/2001 | Lee et al. | 156/391 |
| 6,321,814 | B1 | | 11/2001 | Tracy et al. | |
| 6,347,654 | B1 | | 2/2002 | Koch | |
| 6,403,191 | B1 | | 6/2002 | Casagrande | |
| 6,484,777 | B1 | | 11/2002 | Quinteros et al. | |
| 6,508,914 | B1 | * | 1/2003 | Schwaller et al. | 156/391 |
| 2002/0005255 | A1 | | 1/2002 | Leonardi | |
| 2002/0139489 | A1 | | 10/2002 | Grogg | |

FOREIGN PATENT DOCUMENTS

| | | |
|---|---|---|
| FR | 2 763 913 | 12/1998 |
| GB | 2 351 273 | 12/2000 |
| WO | WO-98/26986 | 6/1998 |
| WO | WO-98/29313 | 7/1998 |

* cited by examiner

*Primary Examiner*—Richard Crispino
*Assistant Examiner*—Chang Sing Po
(74) *Attorney, Agent, or Firm*—Squire, Sanders & Dempsey, L.L.P.

(57) ABSTRACT

An applicator 16 is used to apply a label 10 to a shaped CD ROM (not shown). The applicator 16 comprises a central projection 18 and peripheral locator pins 20*a* and 20*b*, as well as a well 22 in which to receive a shaped CD ROM. A label is secured to a CD ROM held in the well 22 by placing locator tabs of the label over the locator pins 20*a* and 20*b* to ensure correct relative location of the CD ROM and the label.

76 Claims, 5 Drawing Sheets

LABELLING SYSTEM

BACKGROUND OF THE INVENTION

This invention relates to a labelling system, particularly, but not limited to, labels for information bearing media and also an applicator for applying labels to information bearing media.

An existing method for applying a label to a CD (which may be a music CD, a CD ROM or a re-writable CD) or a DVD or the like comprises removing an adhesive label which is die cut from a larger sheet secured to a backing sheet, and placing the label in position on the CD.

Disadvantages arise with this method because a user has difficulty in correctly locating the label relative to the CD. It is very difficult to place the label centrally on the CD by eye. Disadvantages arise because the appearance is incorrect. Also, if the label protruded over the edge of the CD, then the machine reading the CD may malfunction.

An attempt to overcome the above mentioned problem has made use of an applicator to apply a label to a CD or the like. The applicator is used by taking a label from its backing sheet as described above, placing the label in the applicator, then placing the CD in the applicator. The applicator is then activated to press the label onto the CD.

Disadvantages arise with the applicator described because it is very cumbersome and expensive.

SUMMARY OF THE INVENTION

It is an object of the present invention to address the above mentioned disadvantages.

According to a first aspect of the present invention a label assembly comprises a label portion having a front face and a rear, adhesive-carrying face, and a backing portion, to which the rear face of the label portion is releasably secured, the label portion and/or the backing portion comprising label locating means, which are operable to be received in corresponding locating means of a separate label applicator, and which are operable to deter movement of the label assembly relative to a separate label applicator.

The label locating means may be operable to deter rotational movement of the label assembly relative to a separate label applicator.

The label locating means may be peripheral label locating means, which preferably comprise at least one section of the backing portion which extends beyond a periphery of the label portion.

The label locating means may additionally comprise a section located substantially centrally with respect to the remainder of the label assembly.

The peripheral label locating means may comprise at least one projection, which may include an opening. Said opening may be arranged to receive a corresponding projection of a separate label applicator.

The label assembly may be formed by selective weakening, preferably by die cutting, of the edges of the label portion and/or the backing portion. The selective weakening of the edges of the label portion may be at least partially different from selective weakening of the edges of the backing portion. Preferably, the selective weakening of the backing portion produces a larger piece than the selectively weakened label portion.

The front face of the label portion may be adapted to be printed on.

The invention extends to a sheet of label forming material having a front face and a rear, adhesive-carrying face and a backing portion releasably secured to the rear face of the label forming material, said sheet of label forming material and said backing portion having at least one label assembly as described in relation to the first aspect formed thereon.

Preferably, a plurality of label assemblies are formed on the sheet of label forming material and the backing portion.

Preferably, said at least one label assembly is connected to the remainder of the label forming material and the backing portion by frangible joints. Said frangible joints preferably having been formed in the label forming material and/or the backing portion by die cutting.

Preferably, the backing portion is die cut to form a shape larger than that formed on the corresponding part of the label forming material.

According to a second aspect of the present invention, an applicator for applying an adhesive bearing label to an article comprises label receiving means and label locating means, in which the label locating means are arranged to receive and hold in position label locating means of a label assembly placed, in use, in the label receiving means.

The article may be an information bearing medium.

The label receiving means may be a recess in the applictor. Preferably, the recess is substantially the same size and shape as a label assembly arranged to be received in the recess.

The label locating means may comprise at least one projection, which may project above an upper edge of the label receiving means. Said at least one projection is preferably located exterior to the label receiving means. In which case, there are preferably two projections.

The projections may be located on opposite sides of the label receiving means. The projections may be cylindrical.

Alternatively, or additionally, the label locating means may include at least one projection located within the label receiving means.

Alternatively, or additionally the label locating means may comprise at least one recess, preferably two recesses, which may be peripheral to the label receiving means. Where provided, the peripheral recesses may be opposite each other. The recess or recesses may be arranged to receive a portion of the backing material of a label assembly to be applied to an article using the applicator. The portion of backing material may project beyond a label portion of the label assembly.

The applicator may be made of plastics material, preferably only plastics material. The applicator may be formed by a stamping process.

According to a further aspect of the present invention a method of applying a label to an article comprises removing a label assembly from a composite sheet of label forming material and backing material; placing the label assembly in label receiving means of a label applicator, with a label portion of the label assembly lowermost, so that label locating means of the label assembly are held relative to label locating means of the applicator; removing the backing material from the label portion, to leave the label portion in the label receiving means of the applicator with an adhesive face thereof, uppermost; and placing an article on the label portion and applying pressure to adhere the label portion to the article. The article may be an information bearing medium, preferably a CD, DVD or other optical disk.

The applicator may have other features as described in the first aspect of the invention.

The invention may extend to a set comprising at least one applicator as described in the second aspect and at least one label assembly as described in the first aspect.

The label assembly may be part of a composite sheet carrying a plurality of label assemblies.

All of the features described herein can be combined with any of the above aspects, in any combination.

BRIEF DESCRIPTION OF THE DRAWINGS

Specific embodiments of the present invention will now be described, by way of example, with reference to the accompanying drawings, in which.

DETAILED DESCRIPTION OF THE INVENTION

A label 10 for a shaped CD ROM (not shown) is located on a backing sheet 12. The label 10 has a central opening 14 which is larger than the central opening in the shaped CD ROM with which the label is to be used.

Figure 4:
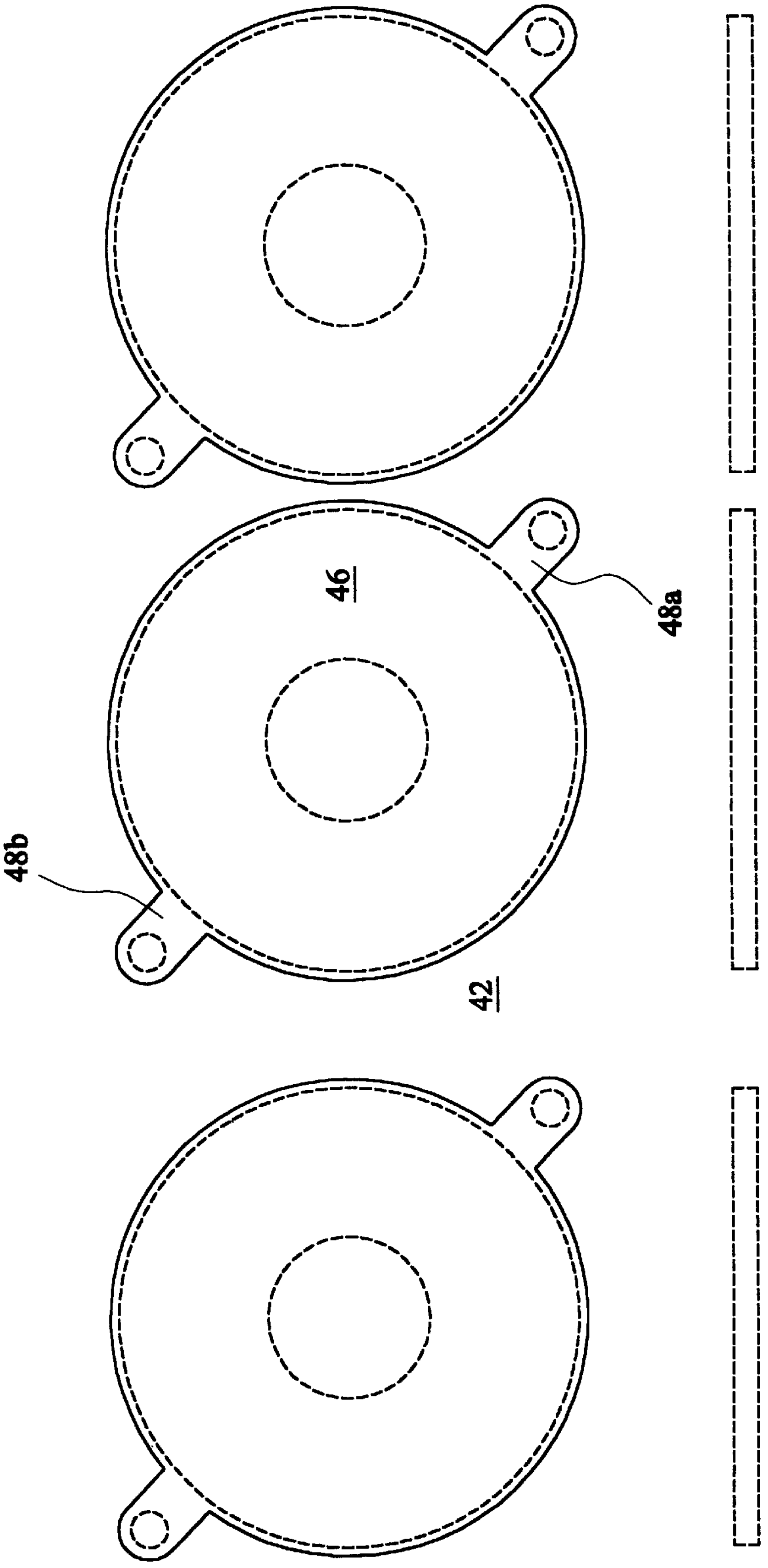
FIG. 4 is a schematic view of the backing sheet of the second embodiment of labels, showing die cutting lines for the backing sheet.
Figure 5:
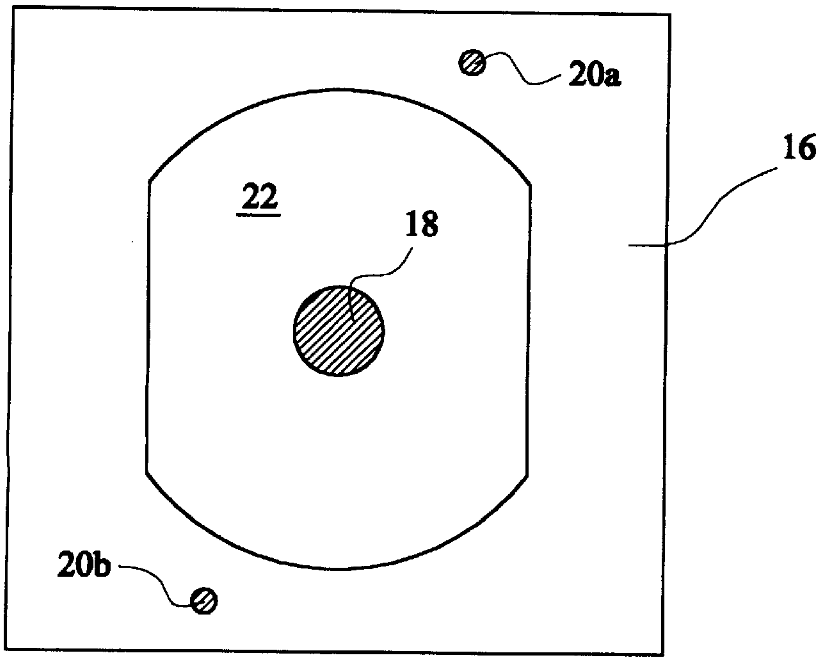
FIG. 5 is a schematic view from above of an applicator for the labels shown in FIGS. 1 and 2.
Figure 6:
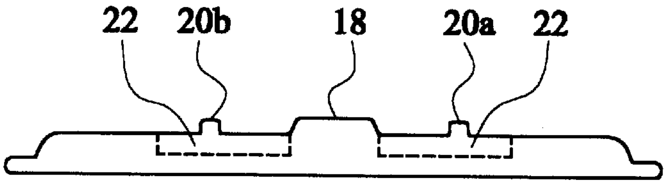
FIG. 6 is a schematic end view of the applicator shown in FIG. 5.

FIG. 4 shows an applicator 16 which is used to apply the label 10 to the shaped CD ROM. The applicator 16 comprises a central projection 18 and peripheral locator pins 20*a* and 20*b*. The applicator also comprises a well 22 in which to receive the shaped CD ROM.

In more detail, the label 10 is held on a sheet 24 comprising a plurality of labels 10. The central opening 14 has a diameter of 15.2 mm formed by removal of a die cut disc portion 15. The label 10 is shaped to be slightly smaller than the shaped CD ROM. The shape is that of a disk with two sections removed from opposite edges. The curved edges of the label have a radius of 39.5 mm. The width of the label between the flat edges is 60 mm.

Each sheet 24 comprises a layer of adhesive backed paper with a backing sheet 12. The labels 10 are die cut on the sheet 24 so that some of the material of the adhesive backed sheet remains after the labels 10 have been die cut and subsequently removed.

The adhesive backed sheet 24 is also die cut to form disc portions 26*a* and 26*b* at opposite sides of the central opening 14. The position of the disc portions 26 is chosen to correspond to the position of the peripheral locator pins 20*a*/*b* when the label is located in the well 22 of the applicator 16. The disc portions can be removed by pressing them out of the remaining material.

Figure 1:
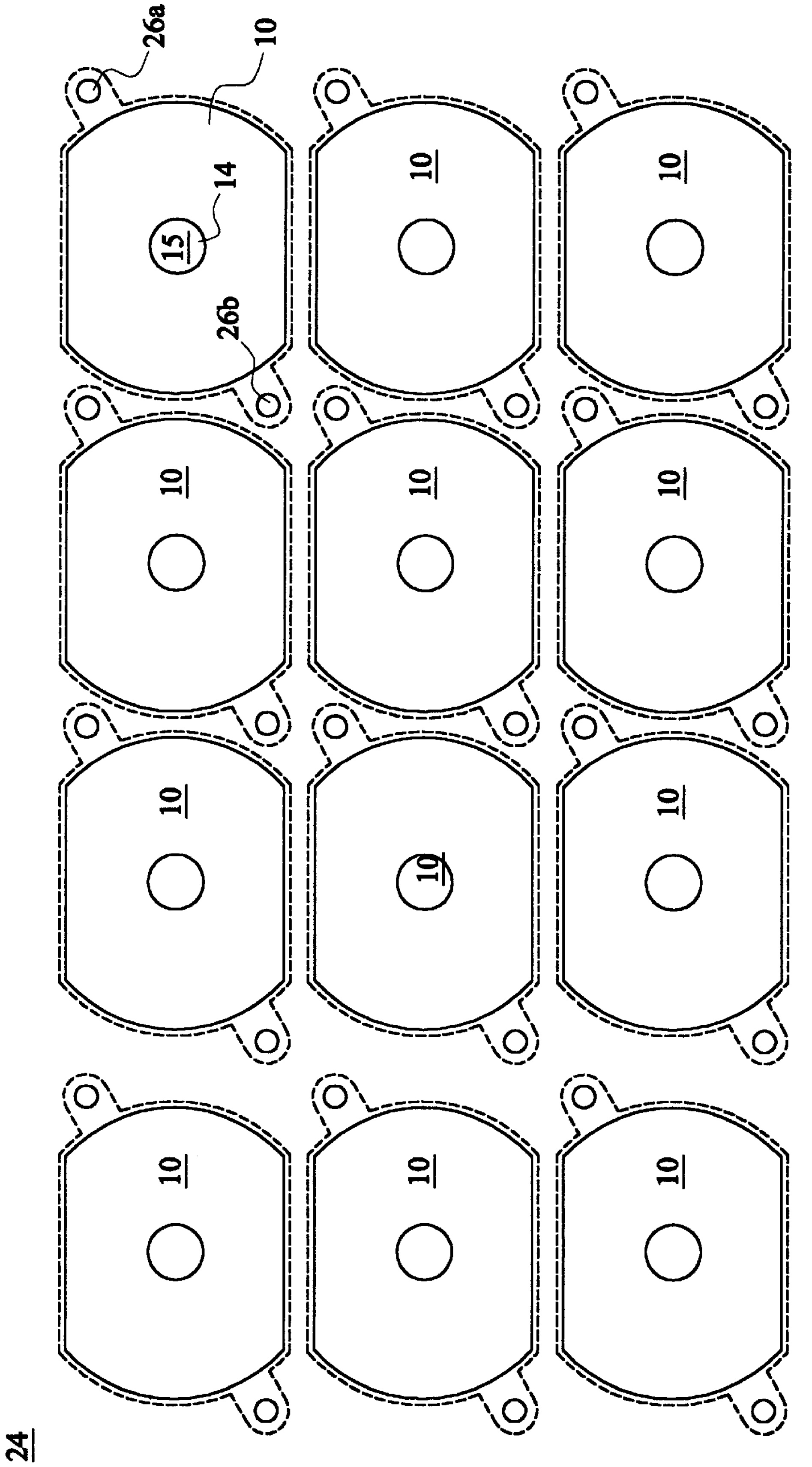
FIG. 1 is a schematic view of a first embodiment of a set of labels on a backing sheet, showing die cutting lines for the labels.
Figure 2:
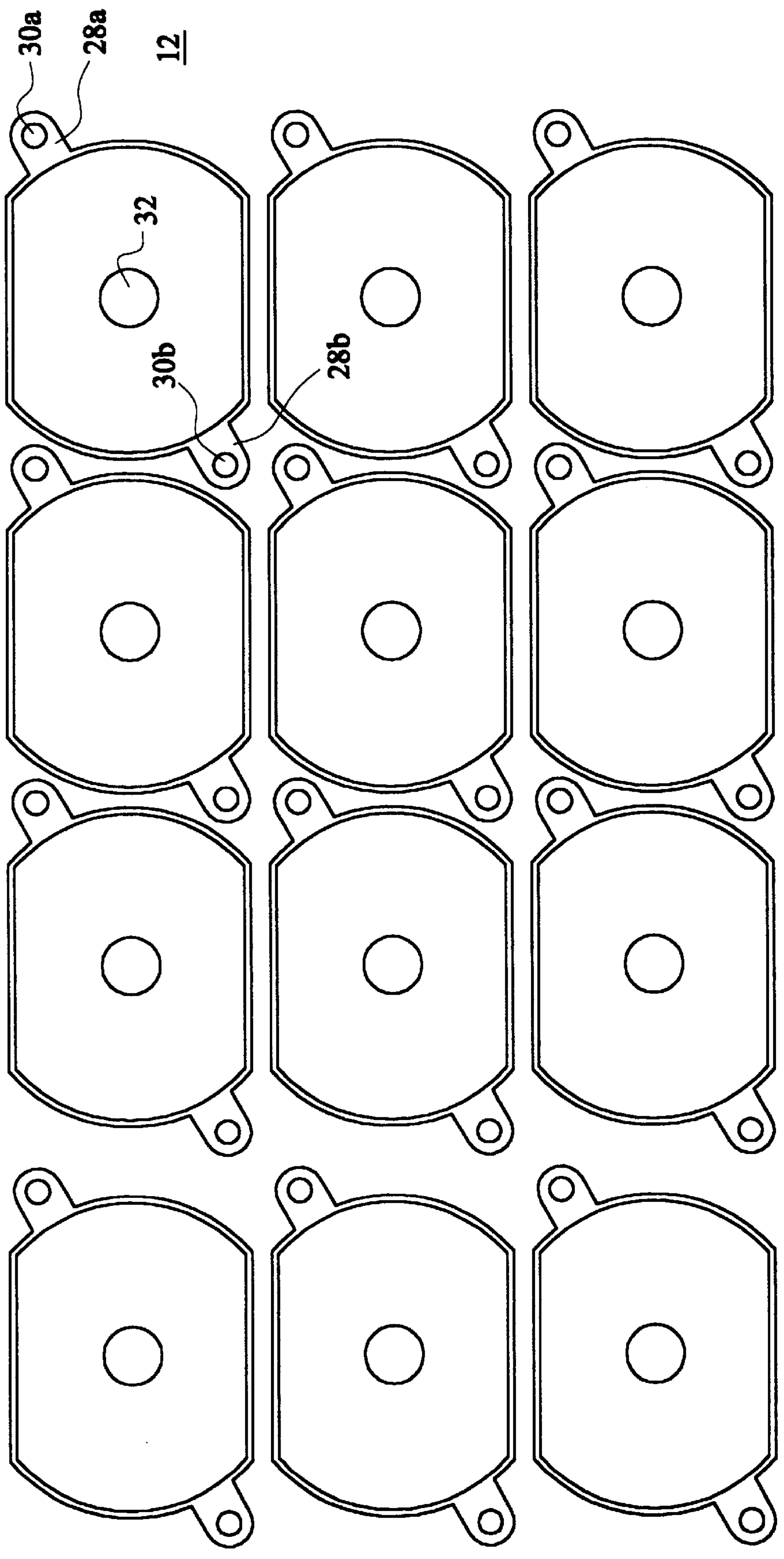
FIG. 2 is a schematic view of the backing sheet of the set of labels in FIG. 1, showing die cutting lines for the backing sheet.

The feature of the backing sheet 12 being die cut is in contrast to existing methods of applying labels to data storage media in which only the label is die cut. FIG. 2 shows the backing sheet 12.

The backing sheet 12 is die cut to be 1.5 mm larger than the majority of the periphery of the labels 10. The radius of the curved part of the backing sheet 12 or a particular label 10 is 41 mm. The width between the cutaway sections of the backing 12 for a particular label 10 is 63 mm.

The section of die cutting on the back sheet 12 for a particular label 10 also comprises tab portions 28*a* and 28*b*. The location of the tab portions 28*a*/*b* are chosen to extend over the peripheral locator pins 20*a*/*b* when the section of backing sheet 12 corresponding to a particular label 10 is placed in the applicator 16. Each tab portion 28*a*/*b* has a disc shape 30*a*/*b* removed therefrom in a location corresponding to that of the disc portions 26*a* and 26*b* and the adhesive backed sheet 24. The removal of the disc portions 30*a*/*b* creates openings which can be placed over the peripheral locator pins 20*a*/20*b* to locate the label 10.

The backing sheet 12 is also die cut to allow for removal of a disc 32 of the backing sheet 12 which corresponds in size and location to the central opening 14 in the label 10.

In use, a section of the sheet 24 bearing a label 10 and its piece of backing sheet 12 is removed from the sheet 24 by pushing the section of backing sheet 12 to disengage that piece from the remainder of the sheet 24. The section of backing sheet 12 bearing the label 10 is larger than the label 10. The discs 26*a*/*b* and 30*a*/*b* are then pushed through to leave openings in the tab portions 28*a*/*b*. The disc 32 is also removed to form the central opening 14.

The backing sheet 12 and label 10 combination is then placed over the applicator 16 so that the openings in the tab portions 28*a*/*b* are received on the peripheral locator pins 28*a*/*b* and so that the central opening 14 and the label 10 is received on the central projection 18. The location of the tab portions allows for the label 10 to be orientated correctly, so that any matter printed on to the label 10 is correctly orientated with respect to the shaped CD ROM. When the backing sheet 12 and label 10 have been located correctly in the applicator 16, the section of backing sheet 12 is removed to leave the label 10 located in the well 22 of the applicator 16, with the adhesive face of the label 10 facing upwards. The CD ROM is then placed onto the label 10 and pushed down into the well 22 of the applicator 16. The pressure on the CD ROM causes the label 10 to adhere to the CD ROM, which can then be removed from the applicator.

In the manner described above, the label 10 is correctly orientated on the CD. Also, it is not necessary for a user to touch the adhesive side of the label 10, because the section of backing sheet 12 can simply be peeled from the label 10 whilst the label is held in the well 22 of the applicator 16. Thus, the disadvantage with prior art methods of having to remove the label by hand from its backing sheet and placing that label in an applicator by hand is avoided. The primary reason for this benefit is the fact that the backing sheet 12 is also die cut, as well as the label 10.

Figure 3:
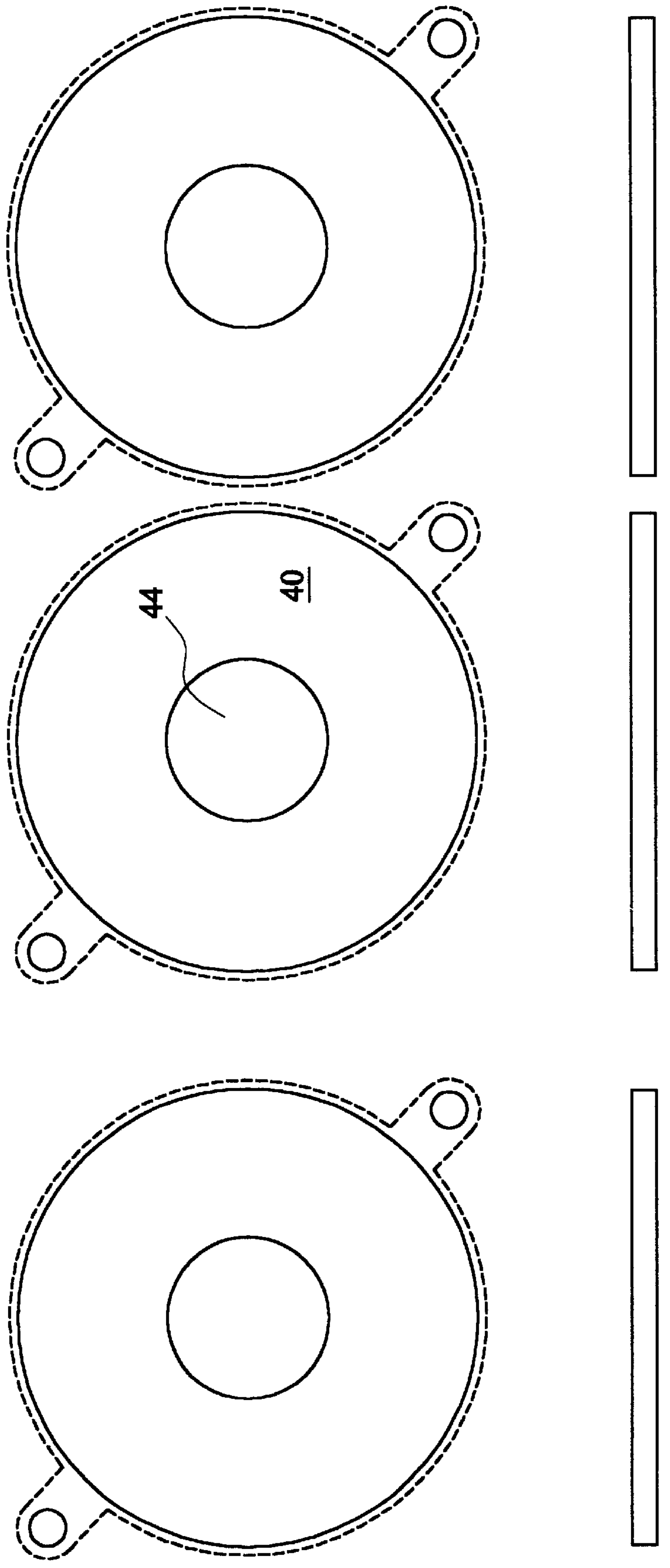
FIG. 3 is a schematic view of a second embodiment of labels on a backing sheet, showing die cutting lines for the labels.

FIGS. 3 and 4 show an alternative embodiment of label 40 held on a backing sheet 42 (see FIG. 4) each label 40 has a central disc section 44 die cut therefrom, which disc section 44 can be removed to reveal a central opening in the label 40. The label is circular having a diameter of 117.5 mm. The disc 44 has a diameter of 41.3 mm.

A section 46 of the backing sheet 42 is also die cut. The sections 46*a* is slightly larger than the label 40 and has a diameter of 120.5 mm. The section 46 of the backing sheet 42 may also have a central disc die cut, which disc has a diameter of 41.3 mm and corresponds to the location of the disc 44 die cut from the label 40.

Figure 7:
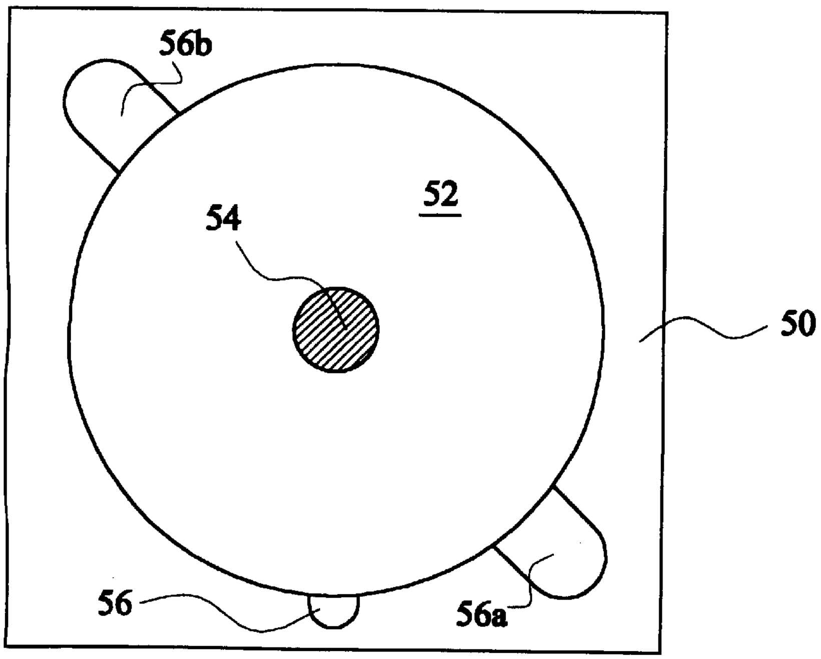
FIG. 7 is a view from above of an applicator for the second embodiment of labels shown in FIGS. 3 and 4.

The section 46 of the backing sheet 42 also has tab sections 48*a*/*b* on the periphery thereof. The tab sections have a width of 15 mm and a generally curved outer shape. The tab sections 48*a*/*b* are provided to allow location of the label 40 and its section 46 of backing sheet 42 in an applicator 50 (see FIG. 7).

The applicator comprises a well 52 which has the same size and shape as the section 46 of the backing sheet 42 mentioned above. The well has a central projection 54 which corresponds in size and shape to the disc 44 which is die cut from the label 40. The well 52 also includes tab receiving sections 56*a*/*b* in which the tab sections 48*a*/*b* of the section 46 of the backing sheet 42 are arranged to be received. The provision of the tab sections 48*a*/*b* and the tab receiving sections 56*a*/*b* and the applicator 50 allows for the location of the label in the applicator in a unique position. The unique position is necessary so that label 40 can be correctly orientated when it has been printed in a previous operation. Rotation of the label is deterred by the tab portion.

As with the first embodiment described in relation to FIGS. 1, 2, 5 and 6 the section 46 of the backing sheet 42 with the label 40 thereon is removed from the remainder of the backing sheet 42. The section 46 is then placed in the well 52 of the applicator 50, the section 46 of backing sheet 42 is then removed leaving the label 40 with its adhesive side up in the well 52. A CD or the like can then be placed and pushed down on the label 40 so that the two are stuck together.

As before, the method and apparatus as described above makes good use of the advantageous die cutting of both the label 40 and the backing sheet 42.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A label applicator for applying an adhesive bearing label portion having a central opening of a label assembly having first and second tabs, to an article, comprising:

an applicator surface;

a central projection projecting up from the surface; and first and second locator pins projecting up from the surface and spaced from one another and from the central projection.

2. The applicator of claim 1 wherein with the label assembly in a position on the applicator, the central projection extends up through the central opening and the first and second locator pins engage the first and second tabs, respectively.

3. The applicator of claim 2 wherein the first and second tabs each include a central tab opening, and with the label assembly in the position the pins extend up through respective ones of the tab openings.

4. The applicator ofclaim 1 wherein the applicator surface has a well and the central projection projects up from a center of the well.

5. The applicator of claim 4 wherein the pins are positioned outside of the well.

6. The applicator of cliam 5 wherein the well has substantially the same size and shape as the label portion.

7. The applicator of claim 1 wherein the central projection has a larger diameter than that of the locator pins.

8. The applicator of claim 1 wherein the locator pins are positioned on diametrically opposite sides of the central projection.

9. A label assembly sheet construction, comprising:

a label sheet;

a backing sheet releasably adhered with adhesive to a rear face of the label sheet;

the label sheet having at least one weakened line defining a label portion;

the backing sheet having at least one weakened line defining a backing portion;

at least one of the label sheet and the backing sheet having at least one weakened line defining tabs extending out beyond a perimeter of the label portion;

the label portion, the backing portion and the tabs at least substantially forming a removable label assembly; and at least one of the tabs having an aperture for receiving a projection of a label applicator when the label assembly is in a position on the label applicator.

10. The construction of claim 9 wherein the label portion of the label assembly has a central opening.

11. The construction of claim 10 wherein the tabs include a pair of tabs oppositely disposed relative to the central opening.

12. The construction of claim 10 wherein the aperture is a first aperture, the tabs include first and second tabs oppositely disposed relative to the central opening, the first aperture is in the first tab, the projection defines a first projection, and the second tab has a second aperture for receiving a second projection of the label applicator when the label assembly is in the position on the label applicator.

13. The construction of claim 12 wherein the second aperture is a through-hole in the second tab.

14. The construction of claim 9 wherein the aperture is a central through-hole in the at least one of the tabs.

15. The construction of claim 9 wherein the label portion when the label assembly is in the position, has an adhesive-carrying rear face thereof disposed upwardly.

16. The construction of claim 9 wherein the backing portion is releasably secured to a rear face of the label portion with the adhesive.

17. The construction of claim 9 wherein the backing portion extends out beyond the entire perimeter of the label portion.

18. The construction of claim 17 wherein the backing portion includes the tabs.

19. The construction of claim 9 wherein the tabs help position the label portion in the position on the label applicator.

20. The construction of claim 19 wherein the tabs block rotational movement of the label portion relative to the label applicator when the label portion is in the position on the label applicator.

21. The construction of claim 9 wherein the label portion has matter printed thereon.

22. The construction of claim 9 wherein the removable label assembly defines a first removable label assembly, and a second removable label assembly is formed by the label sheet, the backing sheet and the adhesive, the second removable label assembly is adjacent to but spaced from the first removable label assembly.

23. The construction of claim 9 wherein the label portion is circular.

24. The construction of claim 9 wherein the label portion is rectangular with round ends.

25. The construction of claim 9 wherein the backing portion has the same shape as the label portion.

26. The construction of claim 9 wherein after the label assembly has been positioned in the position on the label applicator, the backing portion is adapted to be separated from the label portion.

27. The construction of claim 9 wherein at least a portion of the backing portion is disposed outside of a perimeter of the label portion.

28. A label assembly comprising:

a label portion having a front face and an adhesive-carrying rear face;

a backing portion releasably adhered to the rear face; and the backing portion including a central portion and tabs extending out from the central portion and out beyond a perimeter of the label portion, each of the tabs having a positioning aperture.

29. The label assembly of claim 28 wherein the tabs include a pair of tabs oppositely disposed relative to the central portion.

30. The label assembly of claim 28 wherein the aperture is adapted to receive a projection of a label applicator when the label assembly is in a position on the label applicator.

31. The label assembly of claim 30 wherein the aperture is a central through-opening in the tab through which the projection is positionable.

32. The label assembly of claim 30 wherein the tabs include two tabs both of which have a positioning aperture for engaging a respective projection of a label applicator when the label assembly is in a position on the label applicator.

33. The label assembly of claim 32 wherein the tabs block rotational movement of the label portion relative to the label applicator when the label portion is in the position on the label applicator.

34. The label assembly of claim 28 wherein when the label assembly is in position on a label applicator, the adhesive-carrying rear face is disposed upwardly.

35. The label assembly of claim 28 wherein the backing portion extends out beyond the entire perimeter of the label portion.

36. The label assembly of claim 28 wherein the tabs include first and second oppositely disposed tabs.

37. The label assembly of claim 28 wherein the aperture is a tab central through-hole.

38. The label assembly of claim 28 wherein label portion has a central opening.

39. The label assembly of claim 38 wherein the backing portion extends out beyond the entire perimeter of the label portion, and the tabs are positioned on opposite sides of the central opening.

40. The label assembly of claim 28 wherein the label portion has matter printed thereon.

41. A label application method, comprising:

providing a label assembly sheet construction which includes: a label sheet; a backing sheet releasably adhered with adhesive to a rear face of the label sheet; the label sheet having at least one weakened line defining a label portion; the backing sheet having at least one weakened line defining a backing portion; at least one of the label sheet and the backing sheet having at least one weakened line defining tabs extending out beyond a perimeter of the label portion; and the label portion, the backing portion and the tabs at least substantially form a removable label assembly; at least one of the tabs includes an aperture;

removing the label assembly from the sheet construction; and positioning the label assembly on a label applicator with a rear face of the label portion disposed upwardly and with the aperture receiving therein a positioning pin of the label applicator.

42. The method of claim 41 wherein the aperture is a tab central through-hole and the positioning includes manipulating the tab such that the pin extends up through the aperture.

43. The method of claim 41 wherein the backing sheet includes the tabs.

44. The method of claim 41 wherein the label portion includes a central opening, and the positioning includes manipulating the central opening over a projection of the applicator.

45. The method of claim 41 further comprising after the positioning, removing the backing portion from the label assembly with the label portion on the label applicator.

46. The method of claim 45 wherein the backing portion includes the tabs.

47. The method of claim 45 further comprising after the removing the backing portion, placing an article on the label portion and applying pressure to adhere the label portion to the article.

48. The method of claim 47 wherein the article is an optical disc.

49. The method of claim 48 wherein the optical disc is a CD.

50. The method of claim 48 wherein the optical disc is a DVD.

51. The method of claim 48 wherein the backing portion extends out beyond the entire perimeter of the label portion.

52. The method of claim 41 further comprising after the positioning, placing an article on the label portion and applying pressure to adhere the label portion to the article.

53. The method of claim 52 wherein the label portion when the label assembly is removed from the sheet construction, has a central through-opening, and the positioning includes manipulating the label assembly so that a projection of the label applicator extends up through the central through-opening.

54. The method of claim 41 wherein the label portion has matter printed thereon.

55. A label assembly comprising a label portion having a front face and a rear, adhesive carrying face, and a backing portion to which the rear face of the label portion is releasably secured, at least one of the label portion and the backing portion comprising label locating means, which are operable to be received in corresponding locating means of a separate label applicator, and which are operable to deter movement of the label assembly relative to a separate label applicator;

the label locating means are peripheral label locating means, which comprise at least one section of the backing portion which extends beyond a periphery of the label portion; and the peripheral label locating means comprise at least one projection, which includes an opening.

56. A label assembly as claimed in claim 55 in which said opening is arranged to receive a corresponding projection of a separate label applicator.

57. A label assembly as claimed in claim 55 in which the label assembly is formed from a sheet of label forming material and backing material by selective weakening of the edges of at least one of the label portion and the backing portion.

58. A label assembly as claimed in claim 57 in which the selective weakening of the edges of the label portion is at least partially different from selective weakening of the edges of the backing portion.

59. A label assembly as claimed in claim 57 in which the selective weakening of the backing portion produces a larger piece than the selective weakened label portion.

60. A label assembly sheet construction, comprising:

a label sheet;

a backing sheet releasably adhered with adhesive to a rear face of the label sheet;

the label sheet having at least one weakened line defining a label portion;

the backing sheet having at least one weakened line defining a central backing portion and a tab extending out from the central backing portion and out beyond a perimeter of the label portion;

the backing sheet including at least one weakened line defining a tab aperture for the tab; and the label portion, the backing portion and the tab at least substantially forming a removable label assembly.

61. The construction of claim 60 wherein the label portion of the label assembly has a central opening.

62. The construction of claim 61 wherein the tab defines a first tab, the at least one weakened line of the backing sheet defines a second tab extending out from the central backing portion and out beyond the perimeter, the second tab forms part of the removable label assembly, and the tabs are oppositely disposed relative to the central opening.

63. The construction of claim 62 wherein the second tab includes a tab aperture.

64. The construction of claim 60 wherein the backing portion extends out beyond the entire perimeter of the label portion.

65. The construction of claim 60 wherein the label portion has matter printed thereon.

66. The construction of claim 60 wherein the removable label assembly defines a first removable label assembly, and further comprising a second removable label assembly formed at least in substantial part by the label sheet, the backing sheet and the adhesive, and the second removable label assembly being adjacent to but spaced from the first removable label assembly.

67. The construction of claim 66 wherein the second removable label assembly includes a pair of tabs, each having a positioning tab aperture.

68. The construction of claim 67 wherein each of the positioning tab apertures is a tab central through-hole.

69. The construction of claim 60 wherein the label portion is circular.

70. The construction of claim 60 wherein the tab aperture is adapted to receive therein a positioning pin of a label applicator.

71. The construction of claim 60 wherein the tab aperture is adapted to receive therein a positioning pin of a label applicator.

72. The construction of claim 71 wherein the tab aperture is a tab central through-hole.

73. A label assembly comprising:

a label portion having a front face and an adhesive-carrying rear face;

a backing portion releasably adhered to the rear face; and at least one of the label portion and the backing portion including an outwardly extending tab, the tab having a positioning aperture.

74. The label assembly of claim 73 wherein the positioning aperture is a tab central through-hole.

75. The label assembly of claim 73 wherein the tab extends out beyond a circular perimeter of the label portion.

76. The label assembly of claim 73 wherein the backing portion includes the tab.

* * * * *